(12) United States Patent
Oohira

(10) Patent No.: US 11,789,195 B2
(45) Date of Patent: *Oct. 17, 2023

(54) LIQUID CRYSTAL DISPLAY DEVICE

(71) Applicant: Japan Display Inc., Tokyo (JP)

(72) Inventor: Eiji Oohira, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,969

(22) Filed: Mar. 8, 2022

(65) Prior Publication Data

US 2022/0196905 A1 Jun. 23, 2022

Related U.S. Application Data

(63) Continuation of application No. 17/128,308, filed on Dec. 21, 2020, now Pat. No. 11,287,561, which is a (Continued)

(30) Foreign Application Priority Data

Dec. 26, 2012 (JP) ................................. 2012-283108

(51) Int. Cl.
*F21V 8/00* (2006.01)
*G02F 1/13357* (2006.01)
(Continued)

(52) U.S. Cl.
CPC ......... *G02B 6/0055* (2013.01); *G02B 6/0088* (2013.01); *G02F 1/1336* (2013.01);
(Continued)

(58) Field of Classification Search
CPC .. G02B 6/0088; G02B 6/0055; G02B 6/0068; G02F 1/133308; G02F 1/1336; G02F 1/133528; G02F 2001/133317; G02F 1/133524; G02F 1/133615; G02F 2001/133314; G02F 2202/28; G02F 1/133602; G02F 2001/13332; G02F 1/133608; G02F 1/133606; G02F 1/133604; G02F 1/133512; G02F 1/133322; G02F 1/133314; G02F 2201/46; G02F 1/133317; G02F 2202/023; G02F 1/133325; G02F 2201/503; G02F 1/133331; H01L 51/5246;
(Continued)

(56) References Cited

U.S. PATENT DOCUMENTS

| 2009/0185100 A1* | 7/2009 | Matsuhira | G02B 6/005 361/679.01 |
| 2011/0199348 A1* | 8/2011 | Takatani | H04M 1/18 445/24 |

FOREIGN PATENT DOCUMENTS

KR 20100007133 A * 1/2010

* cited by examiner

*Primary Examiner* — Hoan C Nguyen
(74) *Attorney, Agent, or Firm* — Michael Best & Friedrich LLP

(57) ABSTRACT

A liquid crystal display device provided with a liquid crystal display panel having a pair of transparent substrates disposed to face with each other via a liquid crystal layer, and a backlight unit disposed on a back surface of the liquid crystal display panel for radiating a backlight ray is configured to have a plate member opposite a side wall surfaces of the liquid crystal display panel and a side wall surfaces of the backlight unit. The plate member is fixed to the side wall surface of the liquid crystal display panel and the side wall surface of the backlight unit.

4 Claims, 5 Drawing Sheets

Related U.S. Application Data continuation of application No. 16/207,279, filed on Dec. 3, 2018, now Pat. No. 10,901,136, which is a continuation of application No. 15/830,145, filed on Dec. 4, 2017, now Pat. No. 10,175,415, which is a continuation of application No. 15/204,656, filed on Jul. 7, 2016, now Pat. No. 9,864,126, which is a continuation of application No. 14/138,815, filed on Dec. 23, 2013, now Pat. No. 9,411,186.

(51) Int. Cl.
*G02F 1/1333* (2006.01)
*G02F 1/1335* (2006.01)

(52) U.S. Cl.
CPC .. *G02F 1/133308* (2013.01); *G02F 1/133528* (2013.01); *G02B 6/0068* (2013.01); *G02F 1/133314* (2021.01); *G02F 1/133317* (2021.01); *G02F 1/133524* (2013.01); *G02F 1/133615* (2013.01); *G02F 2202/28* (2013.01)

(58) Field of Classification Search
CPC ............. H01L 51/5256; H01L 51/0024; F21V 19/0025; F21V 2200/20; B32B 27/06; B32B 7/00; B32B 7/14; B32B 27/20; B32B 2307/20; B32B 2307/40; B32B 2457/202; B32B 2457/00; B32B 2457/20; B29C 65/48; B29C 65/4845; B29C 65/4875; B29C 65/4835
See application file for complete search history.

LIQUID CRYSTAL DISPLAY DEVICE

CROSS-REFERENCE TO RELATED APPLICATIONS

This application is a continuation of U.S. patent application Ser. No. 17/128,308, filed on Dec. 21, 2020, which, in turn, is a continuation of U.S. patent application Ser. No. 16/207,279 (now U.S. Pat. No. 10,901,136), filed on Dec. 3, 2018, which, in turn, is a continuation of U.S. patent application Ser. No. 15/830,145 (now U.S. Pat. No. 10,175,415). filed on Dec. 4, 2017, which, in turn, is a continuation of U.S. patent application Ser. No. 15/204,656 (now U.S. Pat. No. 9,864,126), filed on Jul. 7, 2017, which, in turn, is a continuation of U.S. patent application Ser. No. 14/138,815 (now U.S. Pat. No. 9,411,186), filed on Dec. 23, 2013. Further, this application claims priority from Japanese Patent Application JP 2012-283108 filed on Dec. 26, 2012, the entire contents of which are hereby incorporated by reference into this application.

BACKGROUND OF THE INVENTION

The present invention relates to a liquid crystal display device, and more particularly, to a technique for fixing a liquid crystal display panel and a backlight unit.

Referring to FIG. 5, a generally employed liquid crystal display device is configured to install a drive circuit DR at a lower side of a liquid crystal display panel LCD shown in the drawing, and to connect a flexible wiring substrate FPC at a position closer to an edge side of the liquid crystal display panel LCD than the drive circuit DR. A double-sided tape TP is attached to a back surface of the liquid crystal display panel LCD while surrounding a display region AR so as to fix the liquid crystal display panel LCD and a backlight unit BU as a light source.

More specifically, as shown in FIG. 6 (sectional view taken along line B-B' of FIG. 5) and FIG. 7 (sectional view taken along line C-C' of FIG. 5), the double-sided tape TP is used to bond the upper surface of a frame-like mold member MD which is formed to surround the light guide plate LG and the optical sheet OS to the back surface of a first substrate SUB1 so that the backlight unit BU is fixed to the back surface of the first substrate SUB1. A reflection sheet RF provided on the back surface of the light guide plate LG has a size sufficient to reach the mold member MD, having the peripheral edge fixed to the back surface of the mold member MD with the double-sided tape TP. Surfaces of the first substrate SUB1 and a second substrate SUB2, which are not in contact with the liquid crystal layer, have polarizing plates POL1 and POL2, respectively. The liquid crystal display panel LCD and the mold member MD are bonded via the polarizing plate POL1 by using the double-sided tape TP.

The liquid crystal display device disclosed in JP-A-2007-163556 is configured to use the double-sided tape for fixing the upper surface of the backlight unit to the back surface of the liquid crystal display panel. Especially, such liquid crystal display device has a large gap between the side edge of the lower polarizing plate and the side edge of the glass substrate so that the double-sided tape is bonded to the resultant gap.

The mobile information terminal such as the mobile phone is demanded to further improve the display performance such as an increase in the number of pixels, and expansion of the display screen while keeping a limited casing size. The liquid crystal display device to be installed in the mobile information terminal has been required to further reduce the width of the frame region as the peripheral area of the display region AR as well as the increased number of pixels. Recently, the liquid crystal display device has been demanded to set the width of the frame region to 0.8 mm or 0.6 mm.

The generally employed liquid crystal display device is configured to use the double-sided tape TP which adheres to the front surface of the mold member MD opposite the frame region of the liquid crystal display panel for fixing the backlight unit BU to the back surface of the liquid crystal display panel LCD. For that reason, when the frame region width is further reduced, the width of the double-sided tape TP for fixing the liquid crystal display panel LCD to the mold member MD is reduced as well, as clearly shown in the sectional views of FIGS. 6 and 7. In this case, the bonded area between the mold member MD and the double-sided tape TP, and the bonded area between the liquid crystal display panel LCD and the double-sided tape TP are decreased, respectively. Especially, the bonded area of the side section where the drive circuit DR is not installed as shown in FIG. 7 is significantly decreased. It is therefore difficult to fix those elements with a predetermined strength. Accordingly, development of technique for fixing the liquid crystal display panel LCD and the backlight unit BU without using the double-sided tape TP has been much needed.

SUMMARY OF THE INVENTION

The present invention provides the liquid crystal display device configured to allow fixation of the liquid crystal display panel and the backlight unit in the frame region with a predetermined strength as well as reduction in the width of the frame region as described below.

(1) The liquid crystal display device according to the present invention includes a liquid crystal display panel having a pair of transparent substrates disposed to face with each other via a liquid crystal layer, and a backlight unit disposed on a back surface of the liquid crystal display panel for radiating a backlight ray. A plate member is disposed opposite a side wall surface of the liquid crystal display panel and a side wall surface of the backlight unit. The plate member is fixed to the side wall surface of the liquid crystal display panel and the side wall surface of the backlight unit.

(2) The liquid crystal display device according to the present invention includes a liquid crystal display panel having a pair of transparent substrates disposed to face with each other via a liquid crystal layer, and a backlight unit disposed on a back surface of the liquid crystal display panel for radiating a backlight ray. The backlight unit includes a light guide plate, a light source opposite a side surface of the light guide plate, a plurality of optical sheets disposed on the light guide plate at a side which receives radiated light rays, and a mold member which surrounds outer peripheries of the light guide plate and the optical sheets. At least one of the pair of transparent substrates has a first side wall surface. The mold member has a second side wall surface. A plate member is disposed opposite the first side wall surface and the second side wall surface. The plate member is fixed to the first side wall surface and the second side wall surface.

The present invention is configured to allow fixation of the liquid crystal display panel and the backlight unit in the frame region with predetermined strength, thus making the frame region width of the liquid crystal display panel significantly small.

Other advantages of the present invention will be clarified by the following description.

DESCRIPTION OF THE PREFERRED EMBODIMENTS

Figure 1:
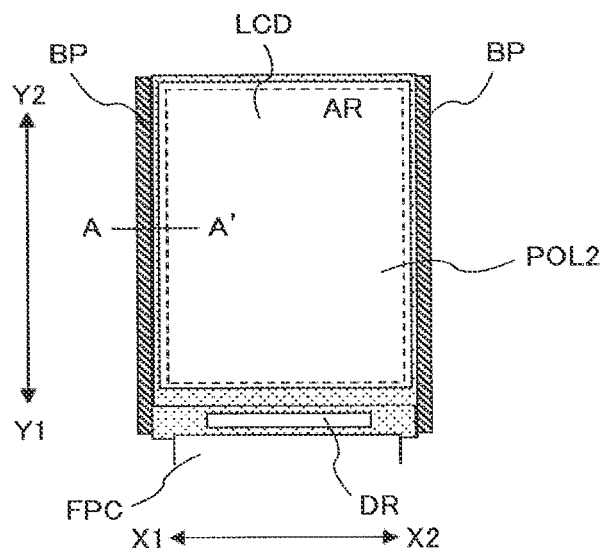
FIG. 1 is a plan view, explaining a schematic structure of a liquid crystal display device according to a first embodiment of the present invention.

Embodiments to which the present invention has been applied will be described referring to the drawings. The same elements in the following embodiments will be designated with the same reference numerals, and explanations thereof, thus will be omitted.

First Embodiment

Overall Structure

FIG. 1 is a plan view for explaining the schematic structure of a liquid crystal display device according to the first embodiment of the present invention. The overall structure of the liquid crystal display device according to the first embodiment will be described hereinafter.

As shown in FIG. 1, the liquid crystal display device according to the first embodiment includes a known liquid crystal display panel LCD with a display region AR indicated by a dotted line in the drawing, and a known backlight unit disposed on the back surface of the liquid crystal display panel LCD. A not-shown box-like frame member (lower frame) having one open surface along the side wall surface may be provided at the side of the backlight unit BU as needed. Furthermore, it may be configured that a not-shown box-like frame member (upper frame) with an open surface formed corresponding to the display region AR is disposed at the side of the liquid crystal display panel LCD, and the upper and the lower frames are fitted so as to hold the liquid crystal display panel LCD and the backlight unit BU.

For example, the liquid crystal display panel LCD is configured to interpose a not-shown liquid crystal layer between a first substrate (may be referred to as TFT substrate) on which not-shown known thin film transistors are formed, and a second substrate (may be referred to as CF substrate) on which red (R), green (G) and blue (B) color filters are formed corresponding to the pixels, which face with each other. A plurality of longitudinally extending video signal lines (drain lines) as indicated by Y1, Y2, and a plurality of laterally extending scanning signal lines (gate lines) as indicated by X1, X2 are formed on the counter surface of the first substrate, that is, the surface in contact with the liquid crystal layer so that the region defined by the drain line and the gate line constitutes the pixel region. A thin film transistor which is ON/OFF driven by a scanning signal from the gate line is disposed around the point where the drain line and the gate line cross each other. The video signal from the drain line in ON state of the thin film transistor is output to a pixel electrode via the thin film transistor.

The counter surface of the second substrate, that is, the surface in contact with the liquid crystal layer corresponds to the color filter of any one of RGB for each pixel so as to constitute the unit pixel for color display with RGB pixels. The second substrate has the side close to the Y1, which is shorter than that of the first substrate. The counter surface of the first substrate exposed from the second substrate, that is, the surface at the side of the liquid crystal layer has a known flexible wiring substrate FPC which receives an input of external image signals, and the drive circuit DR which generates video signals and scanning signals mounted thereon.

The exposed surfaces of the first substrate SUB1 and the second substrate SUB2, which are not in contact with the liquid crystal layer, have known polarizing plates POL1 and POL2 bonded thereto, respectively. Like the generally employed case, the polarizing plates POL1 and POL2 are configured to have the respective ends positioned at the outer side of the display region AR so as to be covered.

The backlight unit for radiating a flat backlight ray is disposed on the back surface of the liquid crystal display panel LCD. Especially, the liquid crystal display device according to the first embodiment is configured to fix the backlight unit to the back surface of the liquid crystal display panel LCD with connection plates BP disposed on edges at X1 and X2 sides of the liquid crystal display panel LCD, that is, opposite sides in the longitudinal direction as described below. In other words, the connection plates BP are disposed at two sides which cross the side on which the drive circuit DR and the flexible wiring substrate FPC are disposed so as to fix the backlight unit to the back surface of the liquid crystal display panel LCD. At least at the point of the side on which the plate BP is disposed, the side edge of the polarizing plate POL1 bonded to the back surface of the first substrate SUB1 is positioned closer to the display region AR than the side edge of the first substrate SUB1 so as not to extend therefrom. That is, at least at the side where the plate BP is disposed, a space (gap) is formed between the fixing member that includes the plate BP and the adhesive layer AD (adhesive), and the side edge of the polarizing plate POL1, preventing the contact between the polarizing plate POL1 and the adhesive layer AD.

Detailed Structure of the Plate

Figure 2:
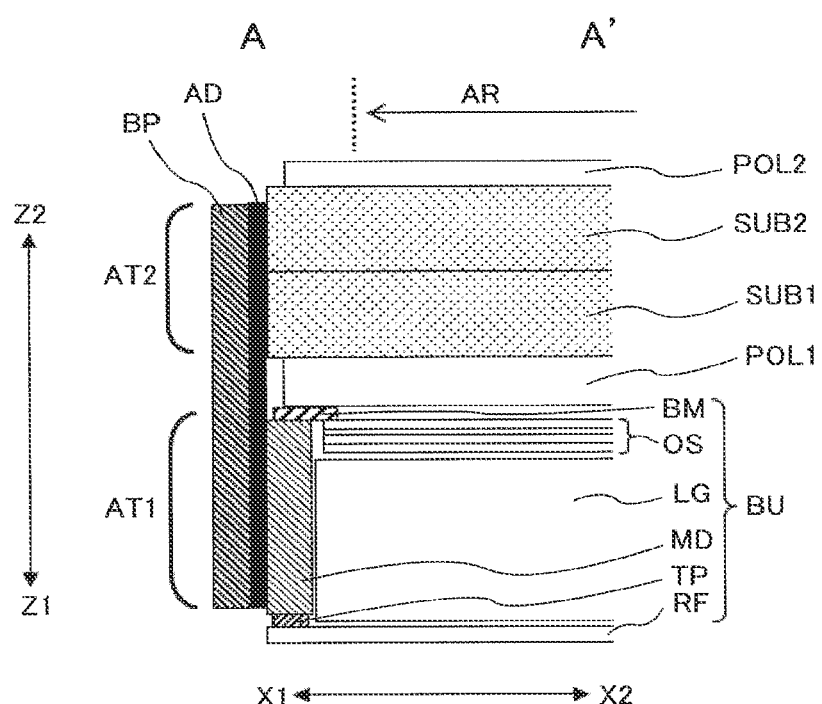
FIG. 2 is a sectional view taken along line A-A' of FIG. 1.

Referring to FIG. 2 as a sectional view taken along line A-A' of FIG. 1, the structure of the connection plate BP for fixing the liquid crystal display panel and the backlight unit of the liquid crystal display device according to the first embodiment will be described in detail.

Referring to FIG. 2, the liquid crystal display device according to the first embodiment is configured to fix the side wall surface of the liquid crystal display panel LCD (peripheral side surface, side surface), that is, side wall surfaces of the first substrate SUB1 and the second substrate SUB2, and the side wall surface (peripheral side surface, side surface) of the backlight unit BU with a fixing member that includes the plate (plate member) BP and the adhesive layer AD that adheres to one surface of the plate BP. In other words, the structure according to the first embodiment is configured to retain the liquid crystal display panel LCD and the backlight unit BU on the side wall surface by means of the plate BP and the adhesive layer AD when fixing the liquid crystal display panel LCD and the backlight unit BU of the members of the liquid crystal display module that constitutes the liquid crystal display device.

Like the generally employed backlight unit BU, the backlight unit BU of the first embodiment is configured to dispose the frame-like mold member MD to surround the light guide plate LG and the optical sheet OS. A frame-like light-shielding tape BM with light shielding property having the side opposite the mold member MD applied with the adhesive is bonded to the upper surface (at the Z2 side) of the mold member MD so as to prevent leakage of the backlight from the end of the backlight unit BU. Accordingly, like the generally employed double-sided tape TP, the inner peripheral side of the frame-like light shielding tape BM is configured to cover the end of the optical sheet OS. The structure is not necessarily required to use the light shielding tape BM.

A known reflection sheet RF with the outside dimension substantially the same as that of the mold member MD is provided on the back surface side of the light guide plate LG. The double-sided tape TP with light shielding property is applied to the overlapped portion between the back surface (surface at Z1 side) of the mold member MD and the reflection sheet RF so that the peripheral part of the reflection sheet RF is fixed to the back surface of the mold member MD, and the light leakage is prevented. As the light guide plate LG, the known one for converting the light from a not-shown light source into the flat light is employed. The optical sheet OS is formed by laminating a plurality of optical sheets such as known prism sheets and diffusion sheets. As the reflection sheet RF, the known reflection sheet is employed.

The aforementioned fixing structure according to the first embodiment allows the respective side wall surfaces of the liquid crystal display panel LCD and the backlight unit BU to serve as adhesive surfaces (side wall parts designated as AT1 and AT2 shown in the drawing). The plate BP is bonded to the side wall surfaces via the adhesive layer AD so as to fix the liquid crystal display panel LCD and the backlight unit BU. In other words, the respective side wall surfaces of the mold member MD disposed at the outermost periphery of the backlight unit BU, and the first and the second substrates SUB1 and SUB2 which constitute the liquid crystal display panel LCD, are set as the adhesive surfaces. The plate BP is bonded to those side wall surfaces with the adhesive layer AD so as to fix the first and the second substrates SUB1 and SUB2, and the mold member MD at the side wall surfaces, that is, outer peripheral surfaces. The fixing structure according to the first embodiment of the present invention is configured that the upper surface of the mold member MD (surface opposite the liquid crystal display panel LCD) and the back surface of the liquid crystal display panel LCD are not used as the fixing regions.

Figure 7:
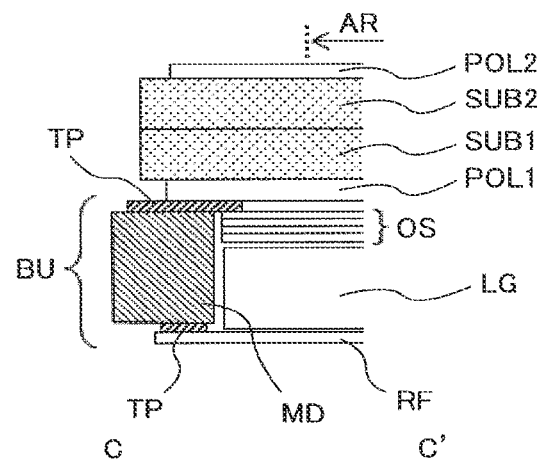
FIG. 7 is a sectional view taken along line C-C' of FIG. 5.

Therefore, the liquid crystal display device according to the first embodiment of the present invention ensures to fix the liquid crystal display panel LCD and the mold member MD with the plate BP even when it is difficult to secure the region where the double-sided tape TP is applied for fixing the liquid crystal display panel LCD and the mold member MD owing to the reduced frame region of the liquid crystal display panel LCD, as shown in FIG. 7. Unlike the generally employed fixing structure, the fixing structure according to the first embodiment allows large reduction in the width of the frame region.

The material member for forming the plate BP is not particularly limited. For example, it is possible to use the material except metal, for example, the resin member such as the known PET and polycarbonate, and the material which contains glass epoxy.

The material with desired rigidity is used for forming the plate BP of the fixing structure according to the first embodiment in order to prevent backlash and displacement of the liquid crystal display panel LCD and the backlight unit BU in Z1 and Z2 directions owing to vertical motion of the liquid crystal display device under vibration and the like.

For example, each of the first substrate SUB1 and the second substrate SUB2 as the glass substrate has a significantly high Young's modulus. However, the mold member MD of the backlight unit BU, which is made of the resin member, has the Young's modulus of approximately 2000 Mpa. Therefore, it is preferable to use the material with the Young's modulus higher than that of the mold member MD, for example, 2000 Mpa or higher for forming the plate BP.

Figure 3:
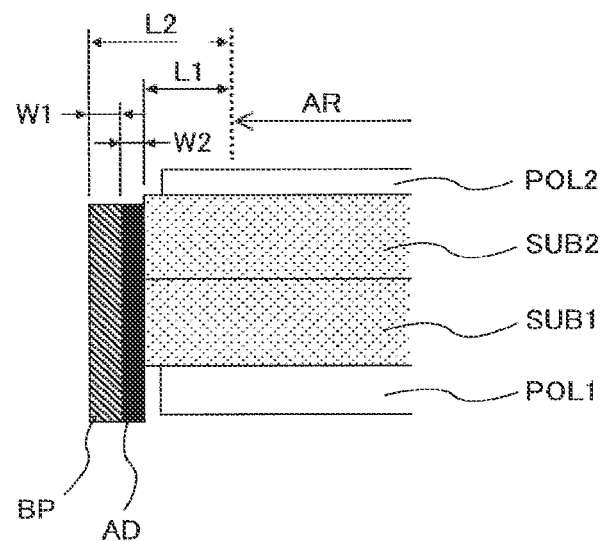
FIG. 3 is a sectional view of an end of a liquid crystal display panel of the liquid crystal display device according to the first embodiment of the present invention.

FIG. 3 is a sectional view illustrating the end of the liquid crystal display panel of the liquid crystal display device according to the first embodiment of the present invention. FIG. 3 is an enlarged sectional view illustrating the end of the liquid crystal display panel in cross-section shown in FIG. 2.

As shown in FIG. 3, the plate BP and the adhesive layer AD are applied to the side wall surfaces of the liquid crystal display panel LCD and the backlight unit BU of the liquid crystal display device according to the first embodiment. A width L2 of the frame region of the liquid crystal display device is obtained by summing a length L1 from the end of the liquid crystal display panel LCD to the display region AR, a width W1 of the plate BP, and a width W2 of the adhesive layer AD, that is, L2=W1+W2+L1.

Figure 5:
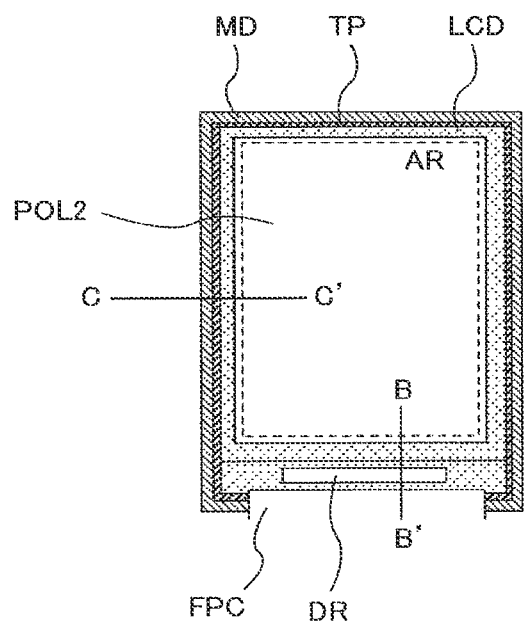
FIG. 5 is a plan view, explaining a schematic structure of a generally employed liquid crystal display device.
Figure 6:
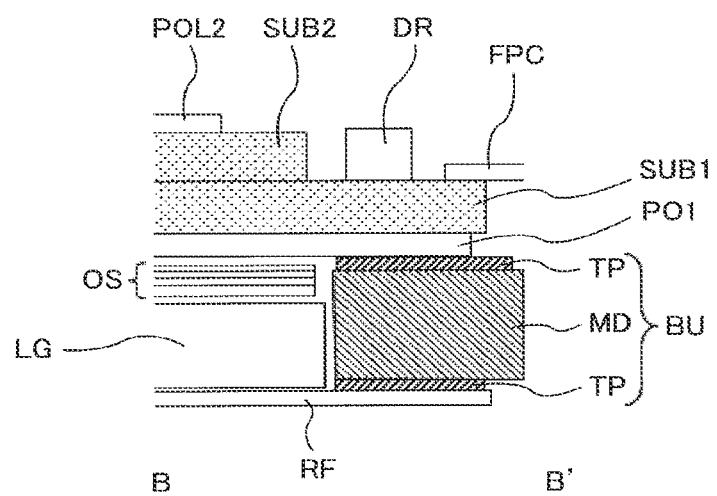
FIG. 6 is a sectional view taken along line B-B' of FIG. 5.

If the polyimide resin material with high Young's modulus is used for forming the plate BP having the width W1 of 0.05 mm approximately, it is possible to secure sufficient rigidity for fixing the liquid crystal display panel LCD and the mold member MD. The adhesive layer AD with the thickness W2 of 0.05 mm may provide sufficient adhesive force. In this case, assuming that the length L1 from the display region AR to the end of the liquid crystal display panel LCD is approximately 0.4 mm (the length that does not allow the double-sided tape TP to be applied as shown in FIG. 7), the width L2 of the frame region shown in FIG. 3 will be derived from the following equation: L2=W1+W2+L1=0.05+0.05+0.4=0.5 mm. The use of the plate BP expands the outer shape of the liquid crystal display device by the amount corresponding to the thickness W1. However, the length L1 of the liquid crystal display panel LCD shown in FIG. 3 may be largely reduced. The width L2 of the frame region of the liquid crystal display device may also be largely reduced in comparison with the generally employed liquid crystal display device shown in FIGS. 5 to 7.

Even if the thickness W1 of the plate BP is equal to or larger than 0.05 mm, for example, 0.1 mm or 0.15 mm, the width L2 of the frame region is approximately 0.6 mm, and accordingly, the frame region of the liquid crystal display device may be sufficiently reduced.

As described above, the fixing structure of the liquid crystal display device according to the first embodiment of the present invention is configured to use the plate BP bonded to the side wall surface or the end surface of the liquid crystal display panel LCD via the adhesive layer AD for fixing the liquid crystal display panel LCD and the backlight unit BU. The generally applied region for accommodating the double-sided tape TP is no longer necessary, thus making it possible to largely reduce the frame region of the liquid crystal display device.

Second Embodiment

Figure 4:
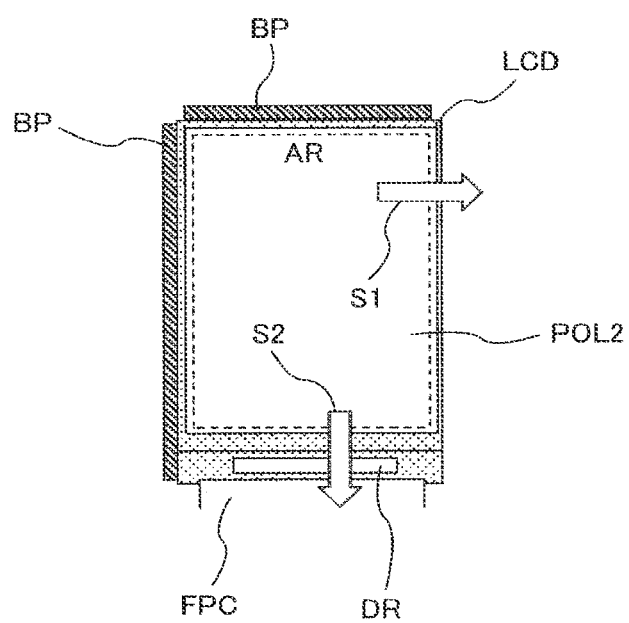
FIG. 4 is a plan view, explaining a schematic structure of a liquid crystal display device according to a second embodiment of the present invention.

FIG. 4 is a plan view for explaining the schematic structure of the liquid crystal display device according to a second embodiment of the present invention, which corresponds to FIG. 1 representing the first embodiment. The liquid crystal display device according to the second embodiment is substantially the same as the first embodiment except the side part on which the plate BP (including the adhesive layer AD) is disposed.

As shown FIG. 4, the liquid crystal display device according to the second embodiment is configured that the plates BP and the adhesive layers AD are disposed on two sides of a left long side and an upper short side that crosses the long side. The upper short side shown in the drawing is opposite the side on which the drive circuit DR is installed. In other words, the liquid crystal display device according to the second embodiment has two sides which define the upper left corner angle, on which the plates BP and the adhesive layers AD are disposed.

The liquid crystal display device according to the second embodiment is configured to align the side wall surfaces of the liquid crystal display panel LCD and the backlight unit BU on at least two sides to which the plates BP are applied. Like the first embodiment, the plate BP allows the liquid crystal display panel LCD and the backlight unit BU to be fixed to the aligned side wall surfaces, thus providing the similar effects to those derived from the first embodiment.

After separation from the mother board, the polarizing plates POL1 and POL2 are bonded to the liquid crystal display panel LCD, respectively. If the size of the liquid crystal display panel LCD has to be made substantially the same as those of the polarizing plates POL1 and POL2 in order to further reduce the frame region, there may be a case where the end of the polarizing plate POL1 protrudes from the end of the second substrate SUB2, that is, the liquid crystal display panel LCD owing to variation in the bonding operation and bonding area when the polarizing plate (lower polarizing plate) POL1 is bonded to the second substrate SUB2.

Among four sides of the rectangular liquid crystal display device according to the second embodiment, the plate BP is not disposed on the sides opposite the sides to which the plates BP are bonded via the adhesive layers AD. The fixing structure according to the second embodiment is configured to bond the polarizing plate POL1 in reference to the two sides on which the plates BP are disposed so that the polarizing plate POL1 projects owing to the aforementioned variation in white arrow directions S1 and S2 shown in the drawing toward the rest of the two sides on which the plates BP are not disposed. This makes it possible to prevent failure upon bonding of the plate BP, which is caused by the projection of the polarizing plate POL1 from the end of the first substrate SUB1.

Even when the side wall surface of the liquid crystal display panel LCD is misaligned with that of the backlight unit BU with respect to all the sides owing to difference in the outside dimension between the liquid crystal display panel LCD and the backlight unit BU, it is preferable to put the misaligned side wall surfaces into those in the direction of the white arrows S1 and S2, that is, the two sides on which no plates BP are disposed. This makes it possible to prevent failure caused by fixing the side wall surfaces of the liquid crystal display panel LCD and the backlight unit BU via the adhesive layers AD using the plates BP. The liquid crystal display panel LCD and the mold member MD may be fixed in a well stabilized way.

Generally, an inorganic material such as the glass substrate is used for forming the first substrate SUB1 and the second substrate SUB2 which constitute the liquid crystal display panel LCD, and the resin member as the organic material is used for forming the mold member MD. In other words, the liquid crystal display panel LCD and the backlight unit BU which are fixed via the plate BP and the adhesive layer AD have different expansion coefficients. Accordingly, there may be a case where values of the expansion quantity in the long-length and the short-length directions owing to the temperature change become different between the liquid crystal display panel LCD and the backlight unit BU.

The fixing structure according to the second embodiment have the sides opposite those provided with the plate BP, at which the liquid crystal display panel LCD and the mold member MD (that is, a part of the backlight unit BU) are not fixed. Therefore, each expansion of the liquid crystal display panel LCD and the backlight unit BU owing to the temperature change may be converged to the arrow directions S1 and S2. This makes it possible to provide the marked advantage of preventing the plate BP from peeling off owing to the difference in the expansion quantity.

As described above, the liquid crystal display device according to the second embodiment is capable of providing the marked advantage of further improving reliability in fixation of the liquid crystal display panel LCD and the mold member MD using the plates BP according to the present invention.

The explanation has been made that the liquid crystal display device according to the first and second embodiments is configured to dispose the adhesive layer AD and the plate BP on two sides. However, the present invention is not limited to the aforementioned configuration. For example, the adhesive layer AD and the plate BP may be disposed on three sides expect the one on which the drive circuit is installed, or disposed on all the sides including the one on which the drive circuit is installed. At the side where the drive circuit is installed, only the first substrate may be aligned with the backlight unit. Therefore, sizes of the adhesive layer AD and the plate BP in the directions Z1 and Z2 have to be made smaller than the other sides.

The fixing structure of the liquid crystal display device according to the first and the second embodiments is applicable to the liquid crystal display panel having electrodes for a coordinate input device (touch panel) built in the pixel, that is, in-cell type touch panel, or the liquid crystal display panel having electrodes for the touch panel between the second substrate and the polarizing plate, that is, on-cell type touch panel.

Figure 8:
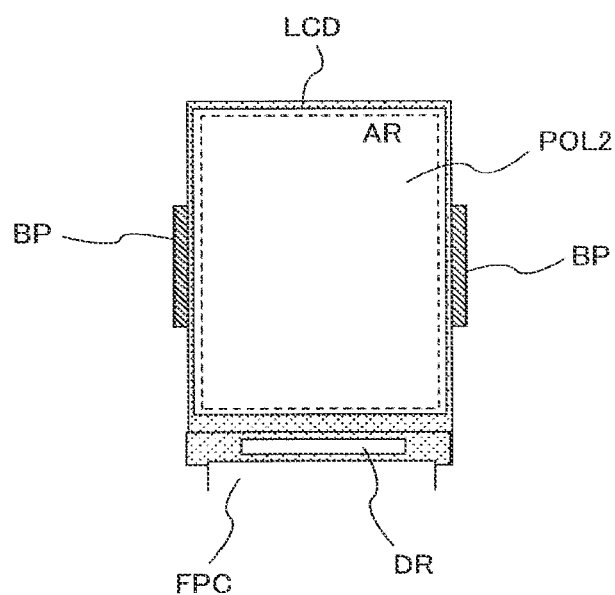
FIG. 8 is a plan view showing another exemplary structure of the first embodiment.
Figure 9:
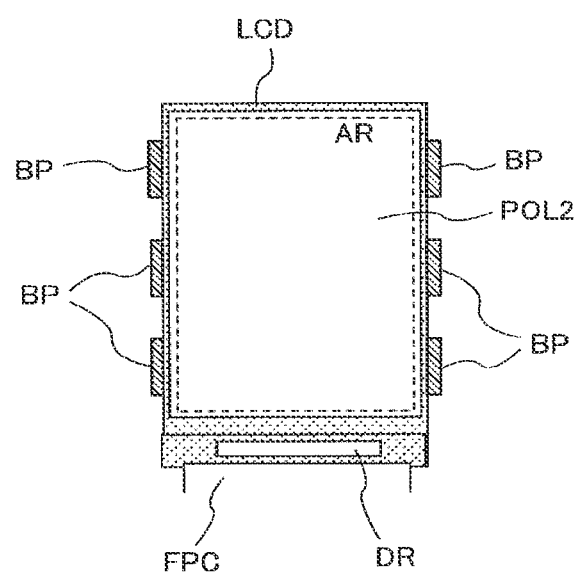
FIG. 9 is a plan view showing yet another exemplary structure of the first embodiment.

The liquid crystal display device according to the first and the second embodiments has been described with the case where the liquid crystal display panel LCD and the backlight unit BU are fixed with the plate BP and the adhesive layer AD across the full length of the single side. However, the present invention is not limited to such configuration. For example, the plate BP may be disposed on a part of the side as shown in FIG. 8, or a plurality of plates BP may be disposed on the single side as shown in FIG. 9.

The present invention has been described in detail by taking exemplary structures as examples. However, the present invention is not limited to those embodiments, and may be modified without deviating from scope of the invention.

What is claimed is:

1. A liquid crystal device comprising:
    a liquid crystal panel including a first substrate, a second substrate, liquid crystal layer disposed between the first substrate, second substrate; and
    a backlight unit disposed for irradiating light to the liquid crystal panel;
    wherein
    the liquid crystal panel and the backlight unit are arranged in a first direction,
    a liquid crystal panel has a first panel side surface,
    the backlight unit has a light source and a mold member,
    the mold member is a frame-like shape,
    the mold member has a mold top surface facing the liquid crystal panel, a mold bottom surface which is not bent towards inside, a first mold side surface which is an inside surface of the mold member and a second mold side surface which is an outside surface,
    a light shielding tape is attached to the backlight unit and the liquid crystal panel,
    a fixing member includes a plate member and an adhesive layer,
    the plate member does not have a bottom portion bent towards inside,
    the adhesive layer adheres to all surfaces in one side of the plate member, and
    the adhesive layer is attached to the first panel side surface and the second mold side surface.

2. The liquid crystal device according claim 1, wherein
    the adhesive layer is a flat adhesive member opposing the first panel side surface and the second mold side surface in continuity, and attaches to the first panel side surface and the second mold side surface by a flat adhesive surface,
    the flat adhesive member does not protrude into a gap between the liquid crystal panel and the backlight unit.

3. The liquid crystal device according claim 1, wherein
    the first panel side surface and the second mold side surface are arranged in the first direction,
    the liquid crystal panel has a thickness in the first direction,
    the fixing member has a thickness in a second direction which is orthogonal to the first direction, and
    the thickness of the fixing member is less than that of liquid crystal panel.

4. The liquid crystal device according claim 3, wherein
    the fixing member has a length in the first direction, and
    the length of the fixing member is less than a thickness of the liquid crystal panel and backlight unit arranged in the first direction.

* * * * *